United States Patent
King et al.

(10) Patent No.: US 10,707,971 B2
(45) Date of Patent: Jul. 7, 2020

(54) ULTRASOUND RANGING FOR MOBILE DEVICES

(71) Applicant: Apple Inc., Cupertino, CA (US)

(72) Inventors: Brian Michael King, Saratoga, CA (US); David Amm, Morgan Hill, CA (US); Scott P. Porter, Cupertino, CA (US); Steven P. Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1019 days.

(21) Appl. No.: 13/794,383

(22) Filed: Mar. 11, 2013

(65) Prior Publication Data
US 2014/0160880 A1    Jun. 12, 2014

Related U.S. Application Data

(60) Provisional application No. 61/735,521, filed on Dec. 10, 2012.

(51) Int. Cl.
*H04B 11/00* (2006.01)

(52) U.S. Cl.
CPC .................................. *H04B 11/00* (2013.01)

(58) Field of Classification Search
USPC .................................................. 367/127, 128
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,198,436 B1 * | 3/2001 | Rudish | G01S 3/48 342/385 |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2012/123787 A1 | 9/2012 |

OTHER PUBLICATIONS

Hazas, M. et al. (2005). "A Relative Positioning System for Co-located Mobile Devices," *MobiSys '05: Proceedings of the 3rd International Conference on Mobile Systems, Applications, and Services*, New York, NY, ACM Press, pp. 177-190.

(Continued)

*Primary Examiner* — James R Hulka
(74) *Attorney, Agent, or Firm* — Morgan, Lewis & Bockius LLP

(57) ABSTRACT

Ultrasonic ranging for mobile devices is disclosed. A mobile device using ultrasonic ranging can include an ultrasound transmitter capable of emitting an ultrasound signal for detection by a proximate device and an ultrasound receiver capable of receiving an ultrasound signal from the proximate device. The mobile device can then use a time lapse associated with one or both of these ultrasound signals to find a range to the proximate device.

10 Claims, 13 Drawing Sheets

(56) References Cited

U.S. PATENT DOCUMENTS

| | | | |
|---|---|---|---|
| 6,842,401 B2* | 1/2005 | Chiang et al. | 367/138 |
| 7,015,894 B2 | 3/2006 | Morohoshi | |
| 7,184,064 B2 | 2/2007 | Zimmerman et al. | |
| 7,292,187 B2 | 11/2007 | Recker | |
| 7,414,705 B2 | 8/2008 | Boillot | |
| 7,663,607 B2 | 2/2010 | Hotelling et al. | |
| 8,479,122 B2 | 7/2013 | Hotelling et al. | |
| 8,654,610 B2* | 2/2014 | Megdal | G01S 5/0045 |
| | | | 367/117 |
| 2003/0071858 A1* | 4/2003 | Morohoshi | 345/856 |
| 2004/0192353 A1* | 9/2004 | Mason et al. | 455/457 |
| 2005/0023524 A1* | 2/2005 | Beatty | 257/59 |
| 2005/0062639 A1* | 3/2005 | Biggs | 342/22 |
| 2005/0285787 A1* | 12/2005 | Delaveau et al. | 342/387 |
| 2006/0026521 A1 | 2/2006 | Hotelling et al. | |
| 2006/0079247 A1* | 4/2006 | Ritter | G01S 5/0289 |
| | | | 455/456.1 |
| 2006/0097991 A1* | 5/2006 | Hotelling et al. | 345/173 |
| 2006/0125693 A1* | 6/2006 | Recker | 342/458 |
| 2006/0197753 A1 | 9/2006 | Hotelling | |
| 2007/0121097 A1* | 5/2007 | Boillot | 356/28 |
| 2008/0102764 A1* | 5/2008 | Thornton et al. | 455/84 |
| 2008/0204322 A1* | 8/2008 | Oswald | G01S 5/04 |
| | | | 342/465 |
| 2009/0295639 A1* | 12/2009 | Zhao | G01S 5/30 |
| | | | 342/387 |
| 2010/0002777 A1* | 1/2010 | Boyle et al. | 375/242 |
| 2011/0003614 A1 | 1/2011 | Langereis et al. | |
| 2011/0086600 A1* | 4/2011 | Muhammad | 455/120 |
| 2011/0119024 A1* | 5/2011 | Nam et al. | 702/150 |
| 2011/0141853 A1* | 6/2011 | Megdal | G01S 5/0045 |
| | | | 367/117 |
| 2011/0148752 A1* | 6/2011 | Alameh | G06F 1/1694 |
| | | | 345/156 |
| 2012/0001875 A1* | 1/2012 | Li et al. | 345/177 |
| 2012/0243375 A1* | 9/2012 | Melvin, II | G01S 3/8083 |
| | | | 367/127 |
| 2012/0303176 A1* | 11/2012 | Wong | G01S 17/023 |
| | | | 701/1 |
| 2013/0099963 A1* | 4/2013 | Wu | G01S 19/46 |
| | | | 342/357.29 |
| 2014/0073345 A1* | 3/2014 | Chintalapudi | G01C 21/165 |
| | | | 455/456.1 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

ULTRASOUND RANGING FOR MOBILE DEVICES

CROSS REFERENCE TO RELATED APPLICATIONS

This application claims priority to U.S. Provisional Patent Application No. 61/735,521, filed Dec. 10, 2012, the entire contents of which are incorporated herein by reference.

FIELD

This relates generally to ultrasound ranging and more specifically to ultrasound ranging for use in mobile devices.

BACKGROUND

Mobile devices are very popular because of their portability, convenience, and versatile functionality. Such devices can include touch functionality that allows a user to perform various functions by touching a touch sensor panel using a finger, stylus, or other object at a location often dictated by a user interface (UI) being displayed by a display device; display functionality that allows a user to view on the display device a variety of information, either passively, such as reading text on the UI, or interactively, such as playing games or chatting in real time to another user; and communication functionality that allows a user to share video, audio, textual, and graphical data with others, through phone call, email, text messaging, chat rooms, music, streaming video, and the like.

Current networks allow mobile devices to connect to other devices in order to share information. In some cases, the devices can be far away from each other. In other cases, the devices can be in close proximity, within transmission capabilities of the individual device.

Taking advantage of device capabilities to easily and quickly facilitate communication therebetween when the devices are in close proximity is desirable.

SUMMARY

This relates to ultrasonic ranging for mobile devices, which allows proximate devices to find each other so as to facilitate communication, data sharing, and other functions therebetween. A mobile device using ultrasonic ranging can include an ultrasound transmitter capable of emitting an ultrasound signal for detection by a proximate device and an ultrasound receiver capable of receiving an ultrasound signal from the proximate device. The mobile device can then use a time lapse associated with one or both of these ultrasound signals to find a range to the proximate device. In some examples, the mobile device can use a time lapse between the time of transmission of its ultrasound signal and the time of receipt of the proximate device's ultrasound signal to calculate a range between the two devices. In some examples, the mobile device can receive a radio frequency (RF) signal from the proximate device and can use a time lapse between the times of receipt of the proximate device's ultrasound signal and RF signal to calculate a range to the proximate device. In some examples, the mobile device can receive an encoded ultrasound signal that includes information identifying the proximate device and can use a time lapse between the time of transmission of the encoded ultrasound signal to calculate a range to the proximate device. Ultrasonic ranging by mobile devices can advantageously increase the versatility of the devices to communicate with each other in a variety of environments and applications.

This summary is provided to introduce concepts in simplified form that are further described below in the Detailed Description. This summary is not intended to identify key features or essential features of the disclosed subject matter and is not intended to describe each disclosed embodiment or every implementation of the disclosed subject matter.

DETAILED DESCRIPTION

In the following description, reference is made to the accompanying drawings in which it is shown by way of illustration specific examples of the disclosure that can be practiced. It is to be understood that other examples can be used and structural changes can be made without departing from the scope of the various examples of the disclosure.

This relates to ultrasonic ranging for mobile devices, which allows proximate devices to find each other so as to facilitate communication, data sharing, and other functions therebetween. A mobile device using ultrasonic ranging can include an ultrasound transmitter capable of emitting an ultrasound signal for detection by a proximate device and an ultrasound receiver capable of receiving an ultrasound signal from the proximate device. The mobile device can then use a time lapse associated with one or both of these ultrasound signals to find a range to the proximate device. In some examples, the mobile device can use a time lapse between the time of transmission of its ultrasound signal and the time of receipt of the proximate device's ultrasound signal to calculate a range between the two devices. In some examples, the mobile device can receive an RF signal from the proximate device and can use a time lapse between the times of receipt of the proximate device's ultrasound signal and RF signal to calculate a range to the proximate device. In some examples, the mobile device can receive an encoded ultrasound signal that includes information identifying the proximate device and can use a time lapse between the time of transmission and the time of receipt of the encoded ultrasound signal to calculate a range to the proximate device.

This further relates to integrating ultrasound with audio in mobile devices, so that both perform robustly with little or no interference from each other's signals. Measures can be taken to mitigate interference between the ultrasound signals and the audio receivers and the audio signals and the ultrasound receivers. In some examples, an ultrasound equalizer can be coupled to the output of an audio receiver to filter out ultrasound signals inadvertently detected by the receiver. In some examples, an acoustic pipe can be coupled to an audio receiver to act as a low pass filter to pass the lower frequency audio signals to the receiver for detection, while attenuating the higher frequency ultrasound signals at the receiver. In some examples, a dense mesh can be disposed between an audio receiver and an ultrasound receiver to act as a low pass filter to pass the audio signals to the audio receiver. In some examples, an acoustic leak can be formed in an ultrasound receiver to create a high pass filter to isolate the ultrasound signals so as to filter the isolated signals from the output of an audio receiver.

Ultrasonic ranging by mobile devices can advantageously increase the versatility of the devices to communicate with each other in a variety of environments and applications.

Figure 1:
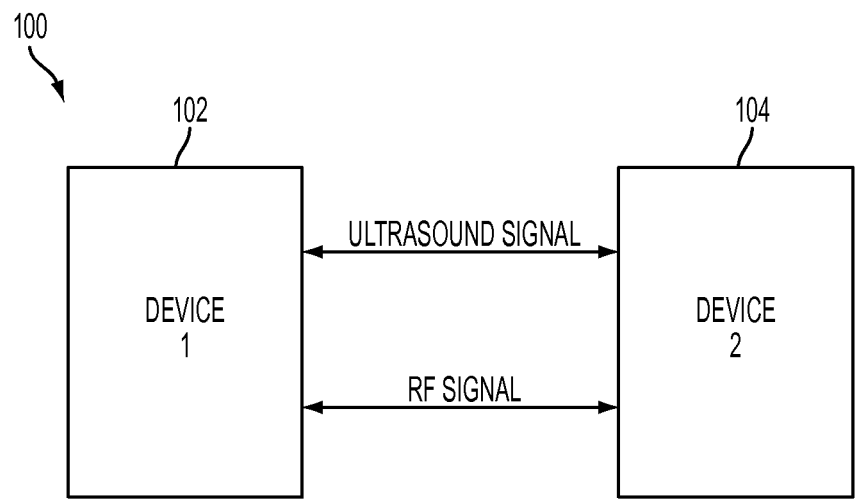
FIG. 1 illustrates ultrasound ranging between mobile devices according to various examples of the disclosure.

FIG. 1 illustrates ultrasound ranging between two mobile devices. In the example of FIG. 1, system 100 can include device 102 and device 104 in close proximity. Device 102 can transmit ultrasound signals to device 104 to determine the distance or range to device 104. Similarly, device 104 can transmit ultrasound signals to device 102. Either device 102, 104 can initiate the transmission of the ultrasound signals, while the other device can respond with transmission of its ultrasound signals. The initiating device can use the two sets of ultrasound signals, e.g., the signals it sent and the signals it received from the other device, to determine the range between the devices. In some examples, both devices 102, 104 can be mobile. In some examples, either device 102, 104 can be mobile, while the other is fixed at a location. In some examples, both devices 102, 104 can be at fixed locations.

In addition to ultrasound signals, device 102 can also transmit radio frequency (RF) signals to device 104 to assist with ranging, to communicate its presence and other information to device 104, and/or to synchronize the two devices' clocks. Similarly, device 104 can transmit RF signals to device 102.

Device 102 can further transmit data, e.g., transaction data, channel and frequency data, device identification data, and so on, to device 104 in the ultrasound, RF, or other electromagnetic signals, such as optical signals. Similarly, device 104 can transmit data to device 102.

Although the example of FIG. 1 shows only two devices, it should be understood that any number of devices, e.g., 3, 4, or more, in close proximity can establish a de facto communication network, using ultrasound signals to determine range of devices, RF signals to synchronize devices, and either or both signals to transfer relevant data, depending on the capabilities of the devices. With a larger number of devices, ultrasound signals can be used for trilateration of all the devices, which can result in a three-dimensional map of the devices. In some examples, with the larger number of devices, one device can be a centralized device to gather information from and share information with the other devices, and estimate the three-dimensional map and orientations of the devices.

It should further be understood that other electromagnetic signals, e.g., infrared (IR), visible light, and the like, can also be used for providing a time reference or other information for the ultrasound ranging according to various examples.

Figure 2:
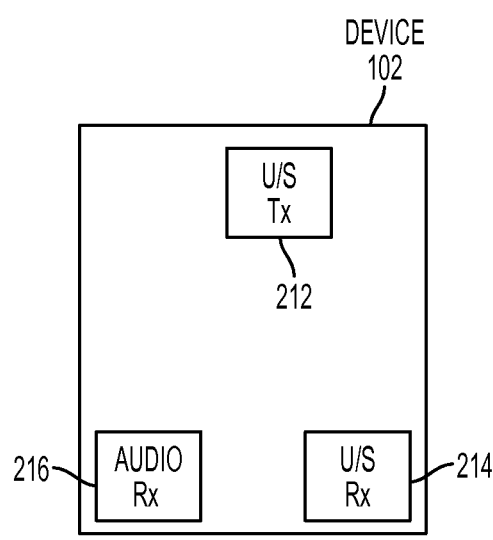
FIG. 2 illustrates a mobile device capable of ultrasound ranging according to various examples of the disclosure.

FIG. 2 illustrates a mobile device capable of ultrasound ranging. In the example of FIG. 2, device 102 can include ultrasound transmitter 212 to transmit ultrasound signals to proximate devices. In some examples, the ultrasound transmitter 212 can be a transducer or any other suitable device for generating and transmitting ultrasound signals. Device 102 can also include ultrasound receiver 214 to receive ultrasound signals from proximate devices. In some examples, the ultrasound receiver 214 can be a microphone or any other suitable device for detecting ultrasound signals.

Although the example of FIG. 2 shows the transmitter and receiver as separate components, it should be understood that the two can be combined as a transceiver to both transmit and receive ultrasound signals. It should further be understood that more than one transmitter and/or receiver can be used to provide stereo capabilities for the device. For example, multiple ultrasound receivers can receive an ultrasound signal at slightly different times, such that the time differences can be used to determine the relative orientation (or angle) to the proximate device.

In addition to ultrasound components, device 102 can include an audio receiver 216 for detecting audio signals, e.g., voice, music, and other audible signals that can be inputted to the device.

Figure 3:
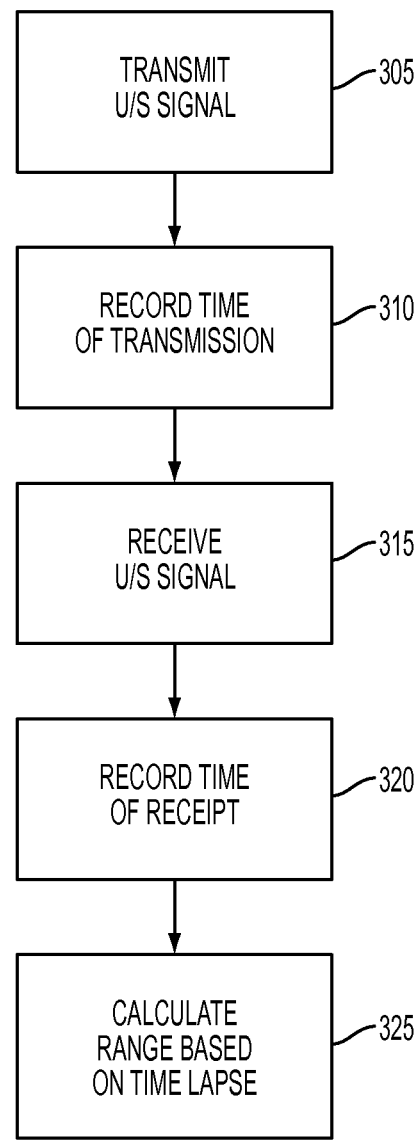
FIG. 3 illustrates a method for finding a range of a device using ultrasound according to various examples of the disclosure.

FIG. 3 illustrates a time-of-flight method for finding a range of a device, e.g., the devices of FIG. 1, using ultrasound. In the example of FIG. 3, a first device can transmit an ultrasound signal (305). The device can record the time at which the transmission occurs (310). A proximate device can receive the transmitted signal and respond by transmitting its own ultrasound signal. The first device can receive the ultrasound signal transmitted from the proximate device (315). The first device can also record the time at which it received the signal from the proximate device (320). The first device can calculate the time lapse between the recorded time of transmission of its ultrasound signal and the recorded time of receipt of the ultrasound signal from the proximate device. Based on the time lapse and the known speed of sound (ultrasound), the first device can then calculate the range to the proximate device (325).

Alternatively, the proximate device can become the initiating device and the first device the responding device. The proximate device can then use the same method to calculate the range to the first device.

In some examples, time corrections can be made in the range calculation to account for any signal delays, e.g., the time for the proximate device to process the first device's signal and then transmit its own ultrasound signal in response, the time that the first device calculates the device range, and so on. In some examples, a predetermined delay can be subtracted from the calculated time lapse. In some examples, the processing of the ultrasound signals and the calculation of the device range can be done by dedicated hardware or a sub-system to provide a faster response. In some examples, the processing of the ultrasound signals and the calculation of the device range can be done by software operating on the device processor or other local or remote processing elements.

An example range calculation can be as follows, $$d = \frac{c}{2}(t_i - t_{off})$$

where d=range or distance of device, c=speed of sound, $t_i$=time lapse between time of transmission of an ultrasound signal at a first device and time of receipt of a return ultrasound signal from a proximate device at the first device, and $t_{off}$=offset time accounting for system delays. This calculation can be used when the first device's transmitter emits a signal and awaiting a return signal from the proximate device, in a "round trip" implementation.

Another example range calculation can be as follows, $$d = c(t_l - t_{off})$$

where $t_l$=time lapse between time of transmission of an ultrasound signal from a first device and time of receipt of that signal at a proximate device. This calculation can be used when the first device's transmitter emits a signal and the proximate device receives that signal, in a "one-way trip" implementation.

Range calculations can sometimes be affected by device orientation. Many devices have inertial sensors to determine device orientation. Accordingly, in conjunction with time lapse data, a device can use its orientation data, a proximate device's orientation data, or both to calculate the range to the proximate device.

Figure 4A:
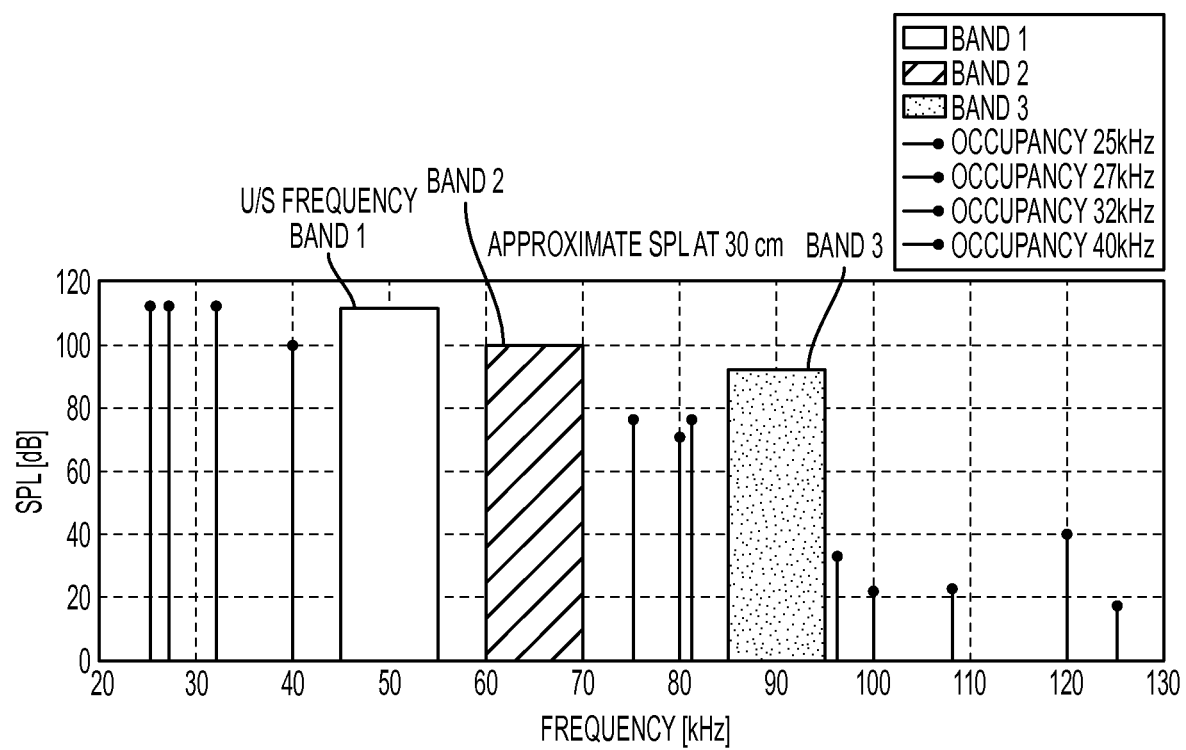
FIG. 4A depicts ultrasound frequency bands that can be used for ranging according to various examples of the disclosure.

Preferably, the frequencies of the ultrasound signals used in range finding fall within a band that can provide adequate performance in the presence of any narrow or wideband interference sources, both indoor and outdoor sources, and in various environmental conditions, e.g., temperature and humidity; and that can produce higher sound pressure levels (SPL). FIG. 4A depicts ultrasound frequency bands that satisfy these preferences. In the example of FIG. 4A, three frequency bands of operation with minimum SPL at 30 cm are shown—band 1 at 45-55 kHz, 110 dB SPL; band 2 at 60-70 kHz, 100 dB SPL; and band 3 at 85-95 kHz, 90 dB SPL. Each band is 10 kHz wide and provides at least 5 frequency channels, e.g., spaced 2.5 kHz apart. These frequency bands can be preferable because of (a) generally low presence (or occupancy) of other narrow or wideband interference sources (highest occupancy being at other frequencies, e.g., 25, 27, 32, and 40 kHz), (b) low attenuation of signals at typical indoor humidity levels, e.g., humidity between 30-50%, and (c) high SPL.

Other configurations of the frequencies for ultrasound signals used in ranging are also possible. In some examples, a wideband signal can be used. In some examples, two wider frequency bands can be used. In some examples, more than three narrower frequency bands can be used. In some examples, more than 5 frequency channels can be used within each band. In some examples, less than 5 frequency channels can be used within each band. In some examples, the channels in each band can be contiguous. In some examples, the channels in each band can be separate. In some examples, the frequency bands can be spaced closer together. In some examples, the frequency bands can be spaced farther apart. In some examples, an ultrasound signal can include multiple narrowband frequency components that span a large frequency range.

Figure 4B:
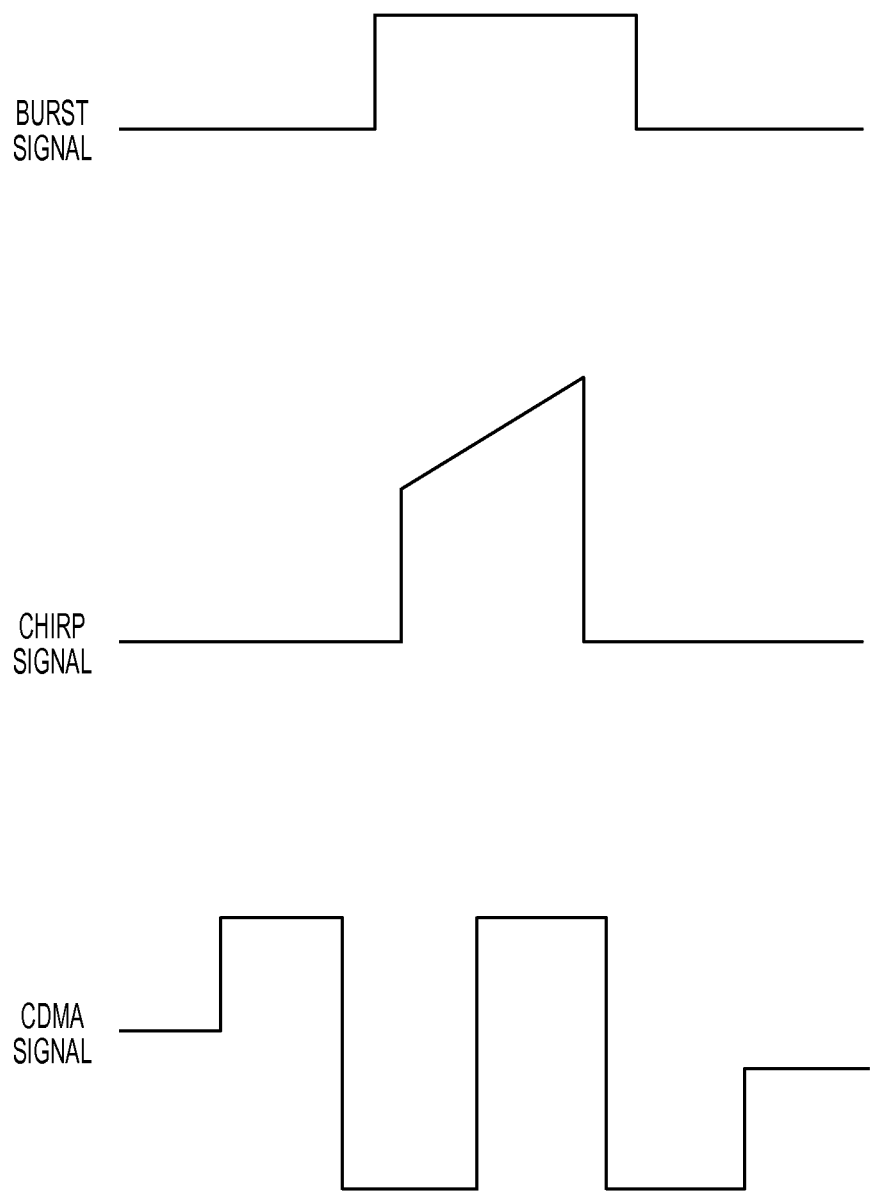
FIG. 4B depicts various types of transmission signals that can be used for ultrasound according to various examples of the disclosure.

Various types of transmissions can be used to transmit ultrasound signals for ranging. FIG. 4B illustrates three such transmission types. In the example of FIG. 4B, a tone burst signal can be used to transmit the ultrasound signals, in which a constant tone amplitude of some duration is transmitted. It should be noted that the pulse shape of the signal is the signal that would multiply a carrier at the desired transmit frequency to produce the waveform that propagates acoustically over the air. Because the tone burst signal, in some examples, is commonly used in ultrasound occupancy sensors, other ultrasound transmissions can be mistaken for the device's ultrasound signal. Accordingly, pulse shaping can be applied to the signal to provide a smoother transition between low and high voltages and to control the bandwidth of the signal and the interference it would create to signals in nearby frequencies. In another example of FIG. 4B, a chirping signal can be used to transmit the ultrasound signals, in which a sine-like wave of some duration is transmitted, where the signal can start at a lower frequency and then ramps up to higher frequencies over the duration of the signal. Because of the frequency changes, the chirping signal can be less sensitive to interference. The chirping signal can also provide higher precision ranging. In another example of FIG. 4B, a CDMA signal can be used to transmit the ultrasound signals to allow multiple devices to transmit over the same channel or within the same frequency band.

It should be understood that other transmission types can be used that are capable of transmitting ultrasound signals for ranging devices.

Figure 5:
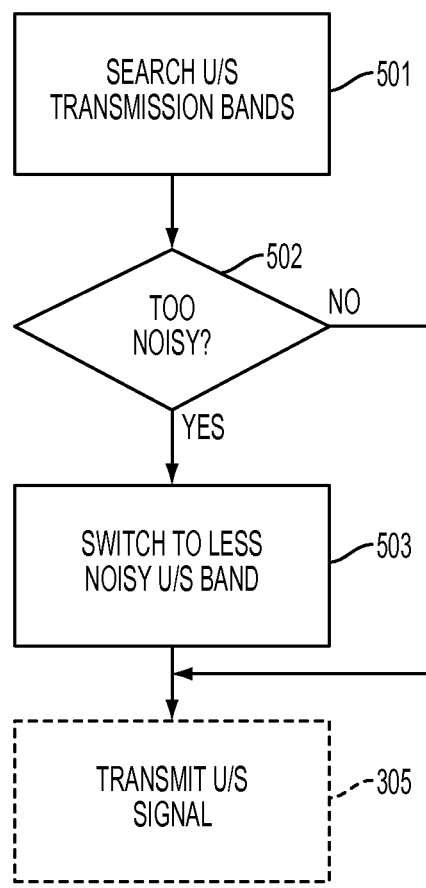
FIG. 5 illustrates a method for selecting an ultrasound frequency band according to various examples of the disclosure.

As mentioned previously, it is preferable that the frequency bands in which the ultrasound signals operate have low occupancy from any narrow or wideband interference sources. As a result, the ability to switch from a noisy frequency band and/or noisy channel within a particular band, i.e., one occupied by many interference sources, to a quieter frequency band and/or channel can be desirable in ultrasound ranging. FIG. 5 illustrates a method for selecting an ultrasound frequency band for a device, e.g., the devices of FIG. 1, in which to transmit ultrasound signals for ranging. In the example of FIG. 5, an ultrasound transmitter can search for a designated operating frequency band, while an ultrasound receiver can detect the level of occupancy in the band (501). Any suitable sniff techniques can be used by the receiver. Based on the occupancy level detected by the receiver, the device can determine whether the frequency band and/or channel is too noisy to transmit the ultrasound signals for ranging (502). If a determination is made that there is too much noise, the ultrasound transmitter of the device can switch to another of the device's designated operating frequency bands and/or channels within a band that is less noisy (503). The ultrasound transmitter can then transmit in the less noisy frequency band and/or channel and proceed as shown in FIG. 3, for example (305).

In some examples, after switching to another frequency band and/or channel, the device can transmit an RF signal communicating the switch to proximate devices so as to coordinate ultrasound communications.

Figure 6:
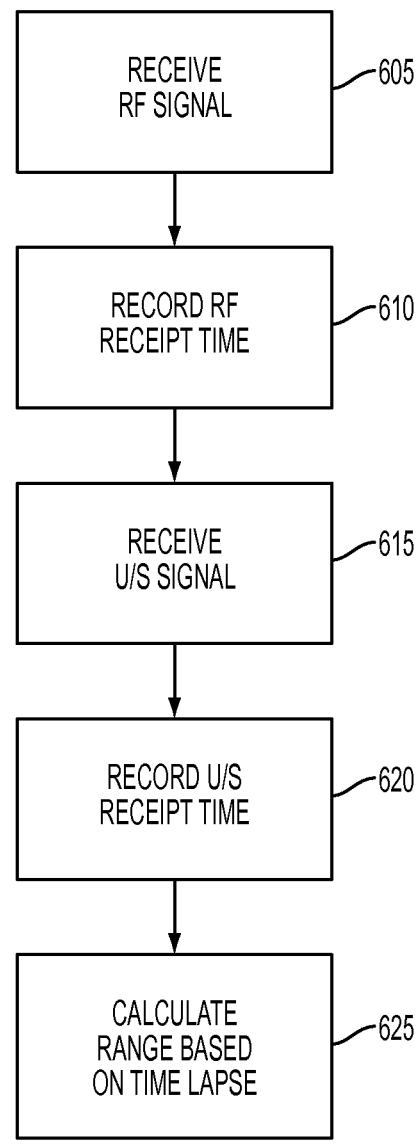
FIG. 6 illustrates a method for finding a range of a device using ultrasound and radio frequency according to various examples of the disclosure.

In addition to the time-of-flight method of FIG. 3 for finding a range of a device using ultrasound, other methods are also possible. FIG. 6 illustrates a time-of-flight method for finding a range of a device using RF signals in addition to ultrasound signals. In the example of FIG. 6, a first device can transmit an RF signal indicating its presence. A proximate device can receive the RF signal (605) and record the time of receipt (610). Immediately after transmitting the RF signal, the first device can transmit an ultrasound signal. The proximate device can receive the ultrasound signal (615) and record the time of receipt (620). Because RF signals travel faster than ultrasound signals, the proximate device can receive the RF signal much sooner than the ultrasound signal. Accordingly, the proximate device can calculate the time lapse between the recorded time of receipt of the RF signal and the recorded time of receipt of the ultrasound signal. Based on the time lapse and the known speed of sound (ultrasound), the proximate device can then calculate the range to the first device (625).

Alternatively, the proximate device can become the transmitting device and the first device the receiving device. The first device can then perform the same method to calculate the range to the proximate device.

In some examples, optical signals, e.g., IR signals, visible light signals, or the like, can be used either with or instead of RF signals for ultrasound ranging.

Figure 7:
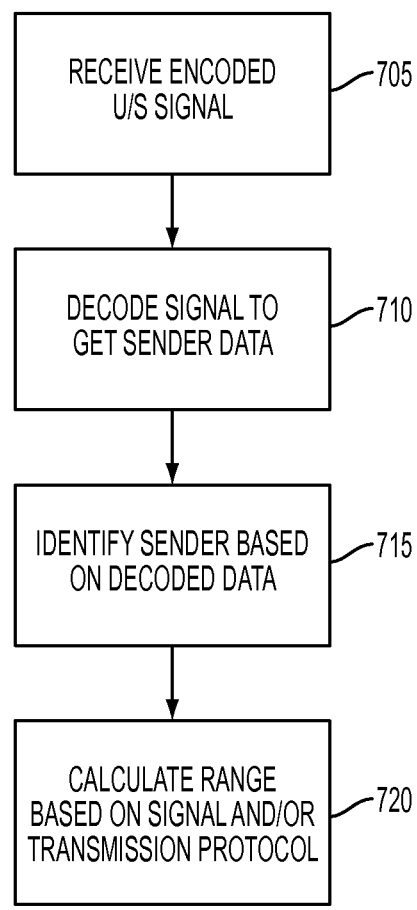
FIG. 7 illustrates a method for finding a range of a device using encoded ultrasound according to various examples of the disclosure.

In additional to range finding, the ultrasound signals can be used to identify proximate devices. FIG. 7 illustrates a method using encoded ultrasound signals. In the example of FIG. 7, a first device can transmit an ultrasound signal modulated or encoded with some kind of pattern. In some examples, the first device can broadcast continuously at a fixed frequency. This can be particularly true for a fixed device waiting from mobile devices to move within range. A proximate device can receive the encoded ultrasound signal (705) and decode the signal (710). Any suitable encoding and decoding techniques can be used. In some examples, the modulation time and algorithm used to encode the ultrasound signal can be fixed, so that the proximate device can easily decode the signal therefrom. The decoded signal can include data to identify the first device and any other suitable information, for example. Based on the decoded signal, the proximate device can identify the first device (715). The encoded ultrasound signal can also include some transmission time information that the proximate device can use to calculate the range of the first device based on the time lapse between the transmission time and the time of receipt of the ultrasound signal from the first device (720). Alternatively, transmission protocols can include timing information for transmitting signals between devices. The proximate device can use this timing information to calculate the range of the first device based on the time lapse between the timing information and the time of receipt of the ultrasound signal from the first device.

In some examples, the encoded ultrasound signal can advantageously be used for codec key distribution between devices so that other devices cannot listen to private communications. Sharing a key in this manner can provide assurances that another device which is not within acoustic range of the transmitting device cannot successfully decode further communications, either RF or ultrasound, that have been encrypted using a key generated based on the shared information. In some examples, error correction codes can be used to verify the decoded information.

It should be understood that ultrasound may be used for other applications, in addition to ranging, such as determining presence of a device in a particular space. That is, a device can detect an ultrasound signal, indicating the presence of the device in the same space of the device which transmitted that ultrasound signal. In another example, a public device can transmit ultrasound signals and associated information to a proximate device to allow the proximate device to determine its location and orientation with respect to the public device by just listening, thereby allowing the proximate device to avoid disclosing or sharing its location, while enjoying the full benefits of high-precision indoor location information. Such public devices can be located in businesses, e.g., restaurants, shopping centers, museums, and the like, where the business may wish to provide indoor location benefits, e.g., business information or online ordering, to devices without requiring the devices to disclose their presence and/or location.

Figure 8:
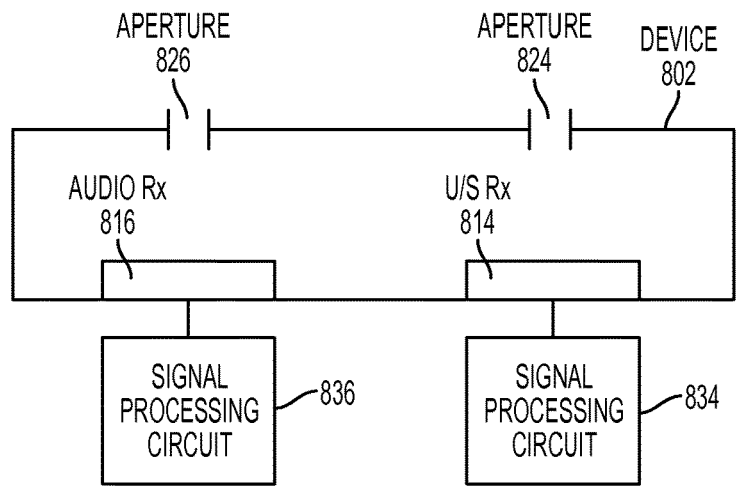
FIG. 8 illustrates a cross-sectional view of a mobile device having multiple apertures and signal processing circuits for audio and ultrasound receivers according to various examples of the disclosure.
Figure 9:
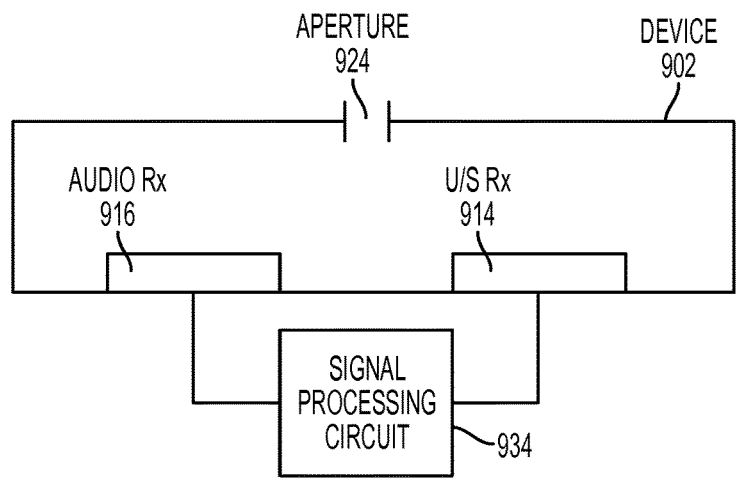
FIG. 9 illustrates a cross-sectional view of a mobile device having one aperture and signal processing circuit for audio and ultrasound receivers according to various examples of the disclosure.
Figure 10:
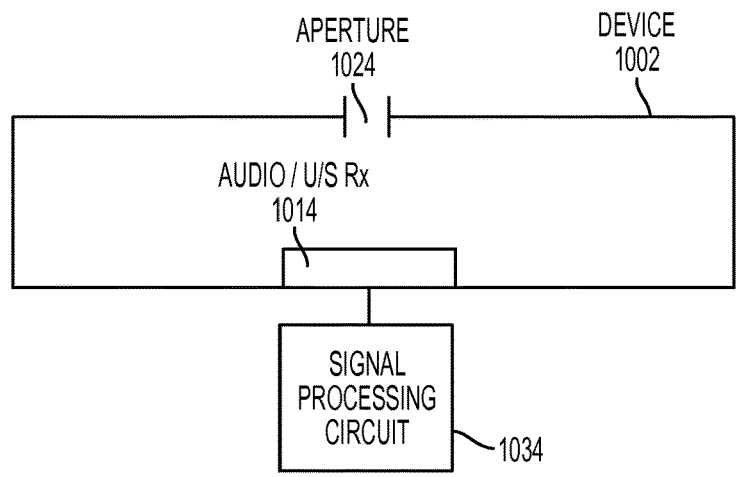
FIG. 10 illustrates a cross-sectional view of a mobile device having one aperture and signal processing circuit for a combination audio/ultrasound receiver according to various examples of the disclosure.

As mentioned in FIG. 2, in additional to ultrasound components, a device can also have one or more audio receivers for detecting audible signals. FIGS. 8 through 10 illustrate cross-sectional views of a device having both audio and ultrasound receiving capabilities. FIG. 8 illustrates a device having entirely separate structures for the audio and ultrasound receivers. In the example of FIG. 8, device 802 can include audio receiver 816 for detecting audio signals. Aperture 826 can be proximate to the audio receiver 816 to allow sound waves through to the receiver. Signal processing circuit 836 can process the detected audio signals. Device 802 can also include ultrasound receiver 814 for detecting ultrasound signals. Aperture 824 can be proximate to the ultrasound receiver 814 to allow sound waves through to the receiver. Signal processing circuit 834 can process the detected ultrasound signals.

FIG. 9 illustrates a device having a shared aperture and shared signal processing circuitry for the audio and ultrasound receivers. In the example of FIG. 9, device 902 can include audio receiver 916 and ultrasound receiver 914 with aperture 924 proximate to the receivers to allow sound waves through to the receivers. Ideally, the audio receiver 916 can detect the audio sound waves through the aperture 924 and the ultrasound receiver 914 can detect the ultrasound waves through the aperture. Device 902 can also include signal processing circuit 934 for processing both audio and ultrasound signals detected by the two receivers 914, 916. The example of FIG. 9 can be used when there are space constraints in the device so as to limit the processing circuitry.

FIG. 10 illustrates a device having a combined audio and ultrasound receiver that covers the frequency ranges of both audio and ultrasound signals. In the example of FIG. 10, device 1002 can include receiver 1014 that can detect audio signals and ultrasound signals. In some examples, the receiver 1014 can be tunable to various frequencies within the ultrasound and audible bands. In some examples, the receiver 1014 can be a combination of different frequency sensitive detectors. Aperture 1024 can be proximate to the receiver 1014 to allow sound waves through to the receiver. Signal processing circuit 1034 can process the detected audio and ultrasound signals. The example of FIG. 10 can also be used when there are space constraints in the device.

It should be understood that other configurations of the audio and ultrasound receivers are also possible. In some examples, multiple audio receivers can be used to create a stereo effect. In some examples, multiple ultrasound receivers can be used to help a transmitting device find its orientation relative to a proximate device or for the proximate device to find its orientation with respect to the transmitting device Generally, the audio signals can have a lower frequency than the ultrasound signals, such that the likelihood of interference at the audio receiver from the ultrasound signals and interference at the ultrasound receiver from the audio signals may be low. However, measures can still be taken to ensure that the two receivers can co-exist so as to provide robust performance for both audio transmission and reception and ultrasound transmission and reception.

Figure 11:
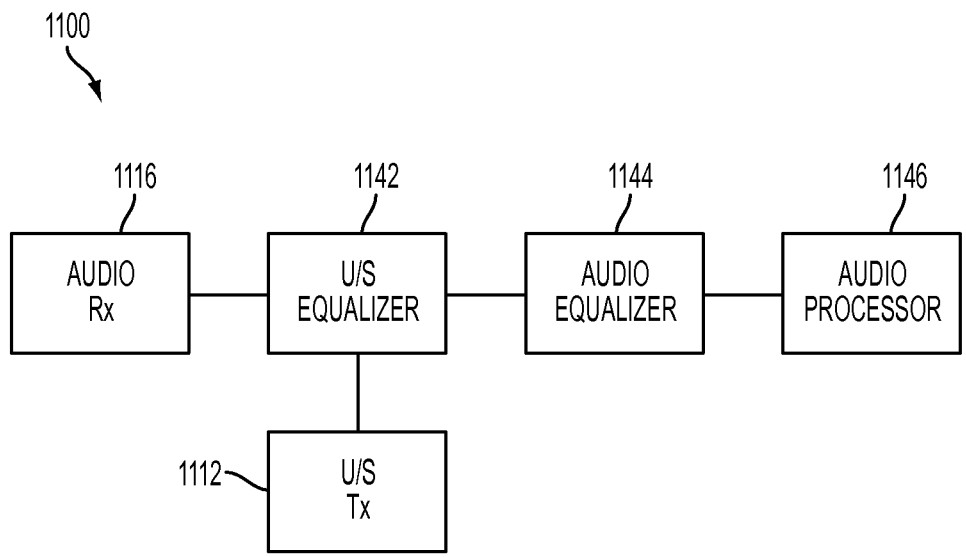
FIG. 11 illustrates an ultrasound compensation circuit for an audio receiver of a mobile device according to various examples of the disclosure.

FIG. 11 illustrates an ultrasound compensation circuit that can be used with an audio receiver of a device to mitigate interference from ultrasound signals at the receiver. In the example of FIG. 11, audio circuit 1100 of a device can include audio receiver 1116 for detecting audio signals, audio equalizer 1144 for smoothing out the detecting signals to meet operating specifications, and audio processor 1146 to process the audio signals, including any signal coding. To mitigate interference from the ultrasound signals, ultrasound equalizer 1142 can be utilized between the audio receiver 1116 and the audio equalizer 1144 to receive the ultrasound signals transmitted by ultrasound transmitter 1112 and, based on the received ultrasound signals, to dynamically filter out those signals from the detected audio signals at the audio receiver 1116. In other words, ultrasound signals transmitted by the ultrasound transmitter 1112 can inadvertently be detected at the audio receiver 1116. Accordingly, the ultrasound equalizer 1142 can compensate the receiver's signals for those ultrasound signals in real time. Similar compensation can be made in the ultrasound circuit to mitigate interference from the audio signals at the ultrasound receiver.

Figure 12:
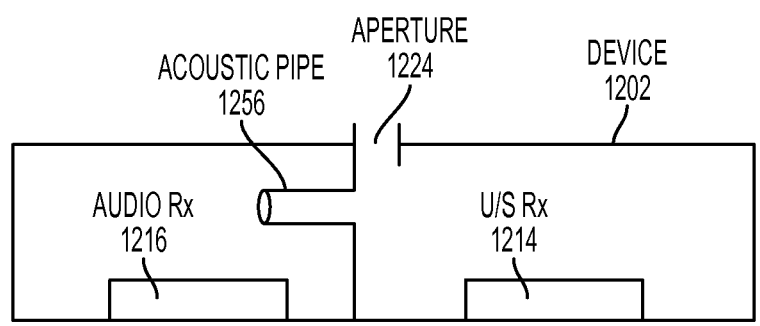
FIG. 12 illustrates a cross-sectional view of a mobile device having an acoustic pipe to mitigate ultrasound interference at an audio receiver according to various examples of the disclosure.

FIG. 12 illustrates an acoustic pipe that can be used with the audio receiver to mitigate interference from ultrasound signals at the receiver. In the example of FIG. 12, device 1202 can include internal acoustic pipe 1256 disposed between audio receiver 1216 and ultrasound receiver 1214 and directed toward the audio receiver. The pipe 1256 can act as a low pass filter, thereby allowing the lower frequency audio signals to pass through to the audio receiver 1216, while attenuating the higher frequency ultrasound signals to the receiver. Aperture 1224 can pass the audio and ultrasound signals through to the receivers 1214, 1216, where the pipe 1256 can filter the signals accordingly.

Figure 13:
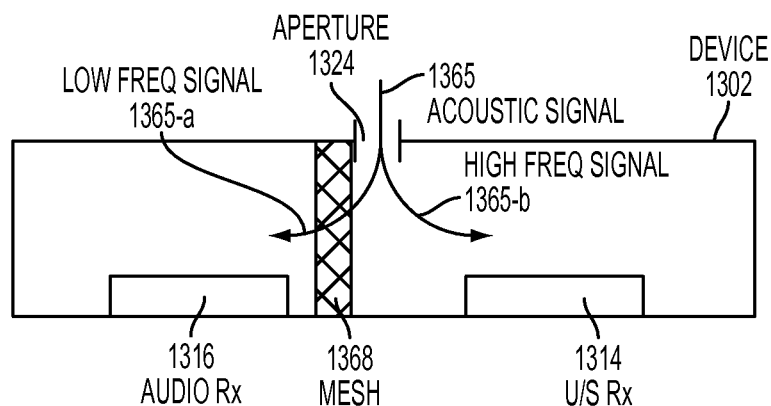
FIG. 13 illustrates a cross-sectional view of a mobile device having a dense mesh to mitigate ultrasound interference at an audio receiver according to various examples of the disclosure.

FIG. 13 illustrates a dense mesh that can be used with the audio receiver to mitigate interference from ultrasound signals at the receiver. In the example of FIG. 13, device 1302 can include dense mesh 1368 disposed between audio receiver 1316 and ultrasound receiver 1314 to artificially lower the roll off frequency and act as a low pass filter, thereby passing the lower frequency audio signals to the audio receiver, while blocking or attenuating the higher frequency ultrasound signals to the audio receiver. FIG. 13 illustrates acoustic signal 1365 that can include audio and ultrasound signals. Upon entering aperture 1324 and encountering the dense mesh 1368, low frequency signal 1365-a, presumably the audio signal, can pass through the mesh to be detected by the audio receiver 1316, while higher frequency signal 1365-b, presumably the ultrasound signal, can reflect to the ultrasound receiver 1314 for detection.

The mesh can be any material suitable for band pass filtering of sound waves. In some examples, the mesh can actively reflect higher frequency signals toward the ultrasound receiver, while passing the low frequency signals to the audio receiver, in effect acting as a frequency beam splitter. In some examples, the mesh could be positioned to act as a high pass filter to pass the high frequency ultrasound signals to the ultrasound receiver, while blocking or attenuating the lower frequency audio signals thereto.

Figure 14:
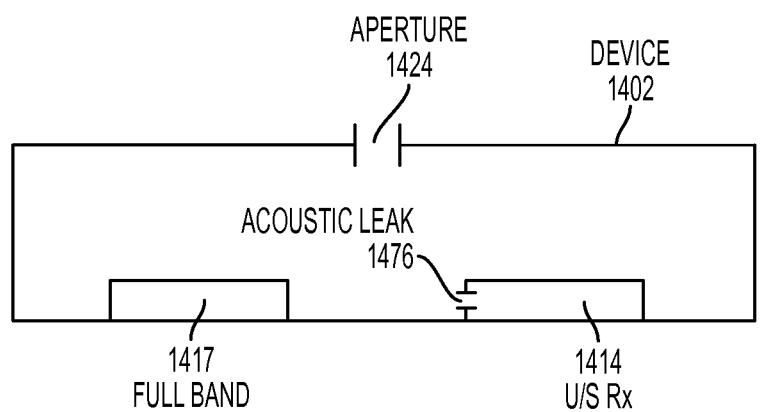
FIG. 14 illustrates a cross-sectional view of a mobile device having an audio receiver with an acoustic leak to mitigate ultrasound interference thereat according to various examples of the disclosure.

FIG. 14 illustrates an acoustic leak in the ultrasound receiver to mitigate interference from ultrasound signals in the audio signals. This can be particularly helpful to mitigate possible operating point changes associated with putting the ultrasound receiver near a high-output acoustic source, e.g., a speaker. In the example of FIG. 14, device 1402 can include ultrasound receiver 1414 with acoustic leak 1476 to create a high pass filter to isolate out the ultrasound signals. In some examples, the leak location can be in the motor housing of the receiver. In some examples, the leak location can be in the diaphragm of the receiver. Device 1402 can also include a full band audio receiver 1417 that can detect a broad range of frequencies, including lower frequency audio signals and higher frequency ultrasound signals. Device 1402 can use the isolated ultrasound signals from the ultrasound receiver 1414 to dynamically filter out those signals from the output of the full band audio receiver 1417, leaving the lower frequency audio signals outputted from the full band receiver 1417. Aperture 1424 can pass the audio and ultrasound signals through to the receivers 1414, 1417. Introducing the acoustic leak can provide a similar solution as the ultrasound compensation circuit of FIG. 11. In some examples, the acoustic pipe of FIG. 12 and the acoustic leak of FIG. 14 can be used together.

Figure 15A:
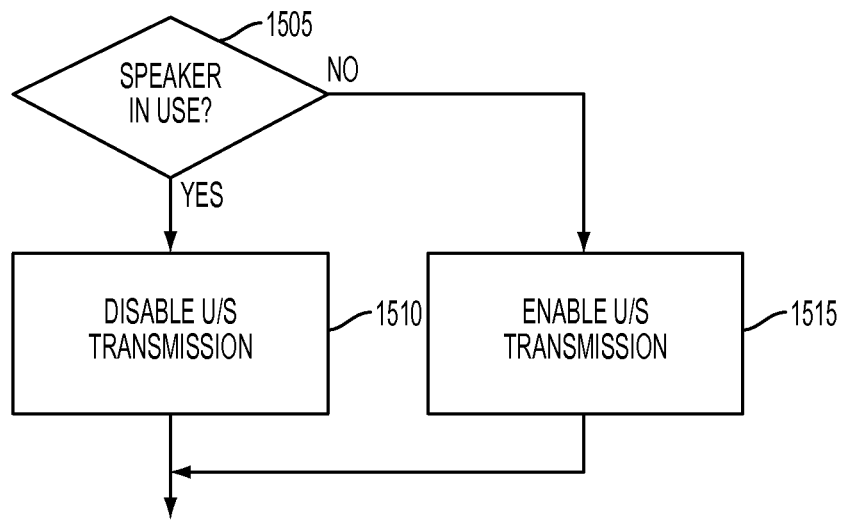
FIGS. 15A and 15B illustrate methods for concurrent audio and ultrasound transmission on a mobile device according to various examples of the disclosure.
Figure 15B:
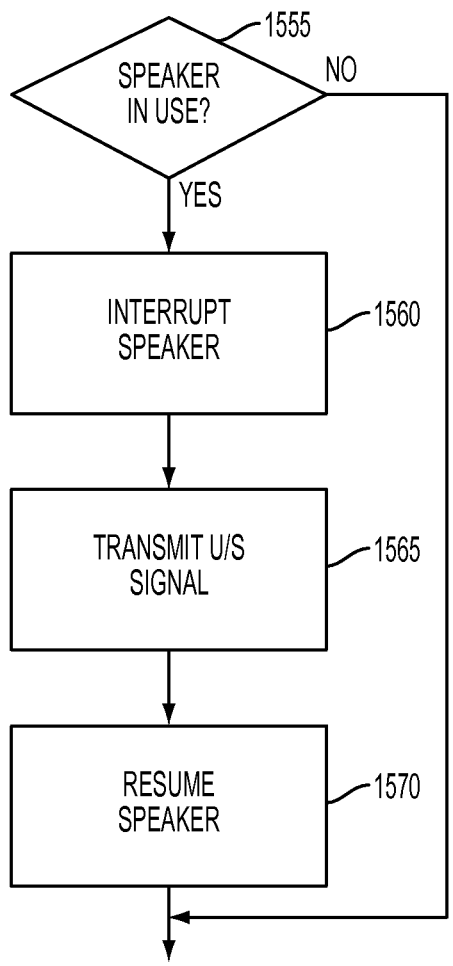

FIGS. 15A and 15B illustrate methods for concurrent audio and ultrasound transmission on a device with a speaker in which interference from ultrasound signals can be mitigated. Most mobile device have speakers to output audio signals, e.g., to listen to a phone call, to play music and video, and so on. The active speakers can be an indication that audio transmission and reception are currently in use, such that ultrasound operation that could potentially interfere is not desirable.

In the example of FIG. 15A, the device can determine whether its speaker is in use (1505). Any suitable techniques can be used for the determination. If the speaker is in use, the device can disable ultrasound transmission until such time that the speaker is no longer in use (1510). If the speaker is not in use, the device can enable ultrasound transmission until such time that the speaker is in use (1515).

In the example of FIG. 15B, the device can determine whether its speaker is in use (1555). If so, the device can temporarily interrupt the speaker's operation (1560), transmit the ultrasound signal (1565), and then resume speaker operation (1570). An interruption can be miniscule so as to be undetectable to the device user.

Figure 16:
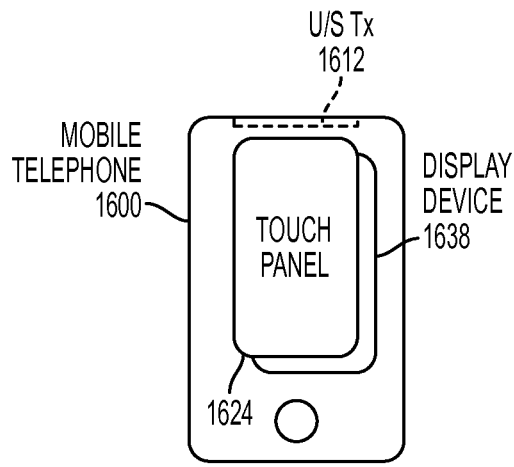
FIG. 16 illustrates a mobile telephone that can include ultrasound ranging according to various examples of the disclosure.

FIG. 16 illustrates an exemplary mobile telephone 1600 that can include touch panel 1624, display 1638, ultrasound transmitter 1612, and other computing system blocks according to various examples.

Figure 17:
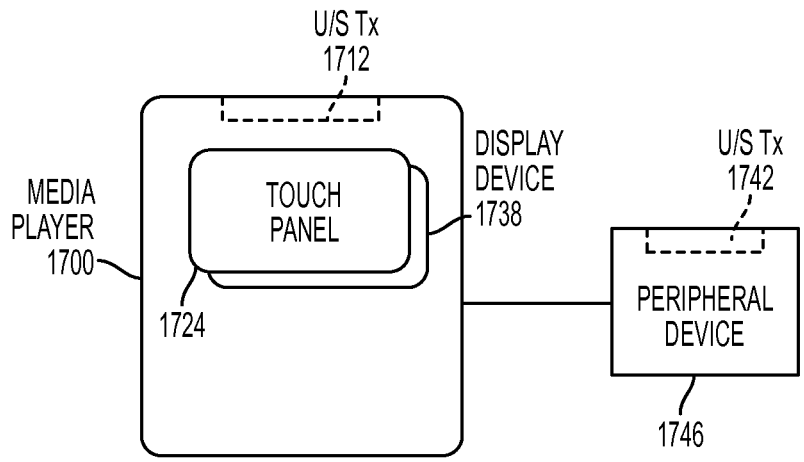
FIG. 17 illustrates a digital media player that can include ultrasound ranging and be optionally coupled to a peripheral device with ultrasound ranging according to various examples of the disclosure.

FIG. 17 illustrates an exemplary digital media player 1700 that can include touch panel 1724, display 1738, ultrasound transmitter 1712, and other computing system blocks according to various examples. The player 1700 can play audio, video, or both and can be optionally coupled to peripheral device 1746 which can include ultrasound transmitter 1742 and be capable of transmitting content, e.g., music, TV, movies, games, and the like, to the player or any other suitable proximate device.

Figure 18:
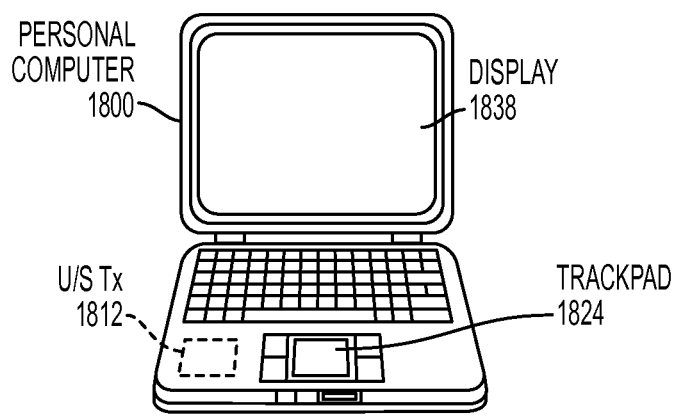
FIG. 18 illustrates a portable computer that can include ultrasound ranging according to various examples of the disclosure.

FIG. 18 illustrates an exemplary personal computer 1800 that can include touch panel (trackpad) 1824, display 1838, ultrasound transmitter 1812, and other computing system blocks according to various examples.

The mobile telephone, media player, and personal computer of FIGS. 16 through 18 can increase capabilities and improve performance with ultrasound ranging according to various examples.

Figure 19:
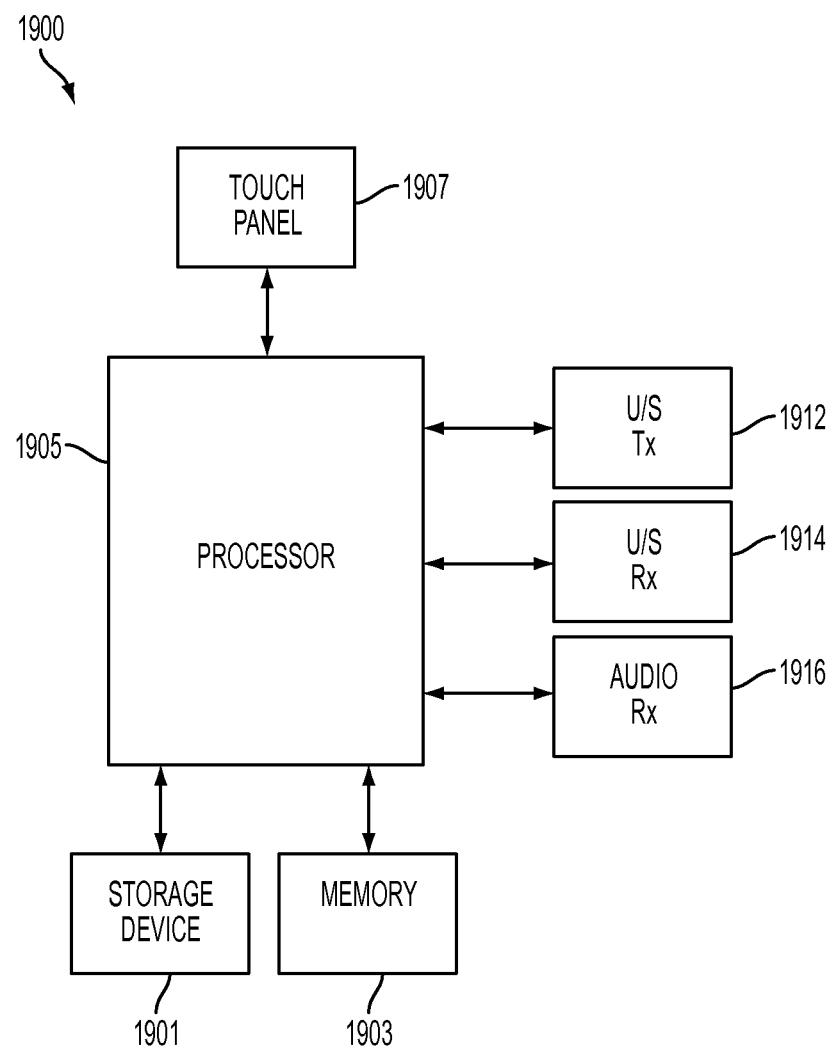
FIG. 19 illustrates a computing system having ultrasound ranging according to various examples of the disclosure.

Ultrasound ranging can operate in a system similar or identical to system 1900 shown in FIG. 19. System 1900 can include instructions stored in a non-transitory computer readable storage medium, such as memory 1903 or storage device 1901, and executed by processor 1905. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 1900 can further include ultrasound transmitter 1912, ultrasound receiver 1914, and audio receiver 1916 coupled to the processor 1905. The transmitter 1912 and receivers 1914, 1916 can be any of those described in FIGS. 1 through 18. The processor 1905 can process inputs to the transmitter 1912 and outputs from the receivers 1914, 1916 to perform actions based on ranges and other data associated with proximate devices.

The system 1900 can include touch panel 1907 coupled to the processor 1905. Touch panel 1907 can have touch nodes capable of detecting an object touching or hovering over the panel. The processor 1905 can process the outputs from the touch panel 1907 to perform actions based on the touch or hover event.

It is to be understood that the system is not limited to the components and configuration of FIG. 19, but can include other or additional components in multiple configurations according to various examples. Additionally, the components of system 1900 can be included within a single device, or can be distributed between multiple devices. In some examples, the processor 1905 can be located within the touch panel 1907 and/or the imaging range finder 1909.

Described above are a number of instances wherein devices communicate using RF signals. It should be understood that the communications described in this document that include the use of RF signals may be performed using technologies such as but not limited to: WiFi (IEEE 802.11a/b/g/n/ac) technology; Bluetooth (including but not limited to Bluetooth Low Energy (BTLE)) technology; Apple Wireless Direct Link (AWDL) technology; IEEE 802.15.4 or Zigbee technology; cellular technology; and/or any other appropriate technology.

Therefore, according to the above, some examples of the disclosure are directed to a mobile device comprising: an ultrasound transmitter capable of emitting a first signal to another device; and an ultrasound receiver capable of receiving a second signal from the other device, wherein the mobile device is capable of determining a range of the other device based on a time lapse associated with the second signal. Additionally or alternatively to one or more of the examples disclosed above, the device further comprises: an RF transmitter capable of transmitting an RF signal to the other device. Additionally or alternatively to one or more of the examples disclosed above, the device further comprises: an optical transmitter capable of transmitting an optical signal to the other device. Additionally or alternatively to one or more of the examples disclosed above, the device further comprises: an audio receiver capable of detecting a third signal from an external audio source. Additionally or alternatively to one or more of the examples disclosed above, the device further comprises: a processor capable of finding the range based on a time lapse between time of transmission of the first signal and time of receipt of the second signal. Additionally or alternatively to one or more of the examples disclosed above, the device further comprises: a processor capable of finding the range based on a time lapse between time of receipt of the second signal and time of receipt of an RF signal received from the other device. Additionally or alternatively to one or more of the examples disclosed above, the device further comprises: an electromagnetic transmitter capable of transmitting an electromagnetic wave to the other device to synchronize a clock of the mobile device with a clock of the other device so as to accurately calculate the time lapse Additionally or alternatively to one or more of the examples disclosed above, the device further comprises: a processor capable of finding the range based on a time lapse between a time of receipt of the second signal and a time of transmission of an encoded form of the second signal. Additionally or alternatively to one or more of the examples disclosed above, the device comprises at least one of a mobile phone, a digital media player, or a personal computer.

Some examples of the disclosure are directed to a method of finding a range of a proximate device, comprising: receiving an ultrasound signal at a mobile device from the proximate device; and calculating a range of the proximate device at the mobile device based on the received signal. Additionally or alternatively to one or more of the examples disclosed above, the method further comprises: transmitting a second ultrasound signal from the mobile device to the proximate device; recording a time of transmission of the second ultrasound signal at the mobile device; and recording a time of receipt of the ultrasound signal from the proximate device at the mobile device, wherein receiving the ultrasound signal comprising receiving the ultrasound signal at the mobile device in response to the proximate device receiving the second ultrasound signal, and wherein calculating the range comprises calculating the range based on a time lapse between the time of transmission of the second ultrasound signal and the time of receipt of the ultrasound signal. Additionally or alternatively to one or more of the examples disclosed above, the method further comprises: searching for a transmission frequency for the ultrasound signal in a less occupied frequency band; and switching between frequency bands to find the less occupied frequency band. Additionally or alternatively to one or more of the examples disclosed above, the method further comprises: recording a time of receipt of the ultrasound signal from the proximate device at the mobile device; receiving an RF signal at the mobile device from the proximate device; and recording a time of receipt of the RF signal from the proximate device at the mobile device, wherein calculating the range comprises calculating the range based on a time lapse between the time of receipt of the ultrasound signal and the time of receipt of the RF signal. Additionally or alternatively to one or more of the examples disclosed above, wherein receiving the ultrasound signal comprises receiving an encoded ultrasound signal, the method further comprises: decoding the encoded ultrasound signal; and identifying the proximate device from information in the decoded ultrasound signal, wherein calculating the range comprises calculating the range based on a time lapse between a time of transmission and a time of receipt of the encoded ultrasound signal.

Some examples of the disclosure are directed to a mobile device comprising: an ultrasound receiver capable of detecting a first signal having a first frequency within a first frequency band; an audio receiver capable of detecting a second signal having a second frequency within a second frequency band; and a mitigation component capable of mitigating interference from the first signal at the audio receiver. Additionally or alternatively to one or more of the examples disclosed above, the mitigation component comprises an ultrasound equalizer coupled to the audio receiver output and capable of compensating for the first signal at the output of the audio receiver. Additionally or alternatively to one or more of the examples disclosed above, the mitigation component comprises an acoustic pipe coupled to the audio receiver and capable of low pass filtering the second signal to the audio receiver and attenuating the first signal at the audio receiver. Additionally or alternatively to one or more of the examples disclosed above, the mitigation component comprises a mesh disposed between the ultrasound receiver and the audio receiver and capable of low pass filtering the second signal to the audio receiver and blocking the first signal at the audio receiver. Additionally or alternatively to one or more of the examples disclosed above, the mitigation component comprises an acoustic leak on the ultrasound receiver to create a high pass filter capable of isolating the first signal so as to filter out the isolated first signal at the output of the audio receiver.

Some examples of the disclosure are directed to a ranging system comprising: a first device; and a second device proximate to the first device, wherein the first device includes an ultrasound transmitter capable of transmitting a first signal toward the second device and at least one ultrasound receiver capable of receiving a second signal from the second device, the first device capable of determining a range of the second device based on at least the second signal, and wherein the second device includes an ultrasound transmitter capable of transmitting the second signal to the first device in response to the first signal from the first device. Additionally or alternatively to one or more of the examples disclosed above, the first and second devices are mobile. Additionally or alternatively to one or more of the examples disclosed above, at least one of the first device or the second device is fixed.

Some examples of the disclosure are directed to a mobile device, comprising: at least one ultrasound receiver capable of receiving an ultrasound signal from a proximate device; and at least one electromagnetic transmitter capable of transmitting an electromagnetic signal to multiple other proximate devices, wherein the mobile device is capable of calculating a time lapse associated with the received ultrasound signal and a range of the proximate device based on the time lapse, and sharing the calculated range with the multiple other proximate devices via the electromagnetic transmitter. Additionally or alternatively to one or more of the examples disclosed above, the electromagnetic signal is at least one of an RF signal or an optical signal. Additionally or alternatively to one or more of the examples disclosed above, the mobile device is a centralized device among the proximate device and the other proximate devices, the mobile device being capable of estimating at least one of three-dimensional location or orientation of the proximate device and the other proximate devices.

Although examples have been fully described with reference to the accompanying drawings, it is to be noted that various changes and modifications will become apparent to those skilled in the art. For example, other steps may be provided, or steps may be eliminated, from the described flows, and other components may be added to, or removed from, the described devices. Such changes and modifications are to be understood as being included within the scope of the various examples as defined in this Detailed Description and by the appended claims.

What is claimed is:

1. A mobile device comprising:
    an ultrasound transmitter configured to emit a first ultrasound signal to a proximate device;
    an RF transmitter configured to transmit an RF signal to the proximate device;
    one or more ultrasound receivers configured to receive a second ultrasound signal from the proximate device subsequent to transmitting the first ultrasound signal; and
    a processor configured to:
        determine a range of the proximate device based on a time lapse associated with the second ultrasound signal and independent of the first ultrasound signal; and
        determine an orientation of the mobile device relative to the proximate device.

2. The mobile device of claim 1, the processor further configured to:
    detect occupancy in a frequency band or channel;
    in accordance with a determination that the detected occupancy in the frequency band or channel exceeds a threshold occupancy, switch to a new frequency band or channel from a current frequency band or channel; and in accordance with a determination that the detected occupancy in the frequency band or channel does not exceed the threshold occupancy, the ultrasound transmitter configured to transmit the first ultrasound signal over the current frequency band or channel.

3. The mobile device of claim 2, further comprising:
in accordance with a determination that the detected occupancy in the frequency band or channel exceeds the threshold occupancy, the RF transmitter configured to communicate the new frequency band or channel to the proximate device; and the ultrasound transmitter configured to transmit the first ultrasound signal over the new frequency band or channel.

4. The mobile device of claim 1, wherein the second ultrasound signal is encoded with a time of transmission of the second ultrasound signal, the processor further configured to:
determine the range based on a time lapse between a time of receipt of the second ultrasound signal and the time of transmission of the second ultrasound signal.

5. The mobile device of claim 1, the processor further configured to:
determine the range based on a time lapse between time of transmission of the second ultrasound signal and time of receipt of the second ultrasound signal.

6. The mobile device of claim 1, the processor further configured to:
determine the range based on a time lapse between time of receipt of the second ultrasound signal and time of receipt of an RF signal received from the proximate device.

7. The mobile device of claim 1, further comprising:
an electromagnetic transmitter configured to transmit an electromagnetic wave to the proximate device to synchronize a clock of the mobile device with a clock of the proximate device so as to accurately calculate the time lapse.

8. A method comprising:
receiving an ultrasound signal at a mobile device from a proximate device;
recording a time of receipt of the ultrasound signal from the proximate device at the mobile device;
receiving an RF signal at the mobile device from the proximate device;
recording a time of receipt of the RF signal from the proximate device at the mobile device;
calculating a range of the proximate device at the mobile device based on a time lapse between the time of receipt of the ultrasound signal and the time of receipt of the RF signal;
sharing the calculated range with a plurality of other proximate devices; and
mapping at least one of a three-dimensional orientation and location of the proximate device and the plurality of other proximate devices.

9. A method comprising:
detecting occupancy in a frequency band or channel;
in accordance with a determination that the detected occupancy in the frequency band or channel exceeds a threshold occupancy, switching to a new frequency band or channel from a current frequency band or channel;
in accordance with a determination that the detected occupancy in the frequency band or channel does not exceed the threshold occupancy, transmitting a first ultrasound signal over the current frequency band or channel from a mobile device to a proximate device;
recording a time of transmission of the first ultrasound signal at the mobile device;
receiving a second ultrasound signal at the mobile device from the proximate device in response to the proximate device receiving the first ultrasound signal;
recording a time of receipt of the second ultrasound signal from the proximate device at the mobile device;
calculating a range of the proximate device at the mobile device based on a time lapse between the time of transmission of the first ultrasound signal and the time of receipt of the second ultrasound signal
sharing the calculated range with a plurality of other proximate devices; and
mapping at least one of a three-dimensional orientation and location of the proximate device and the plurality of other proximate devices.

10. The method of claim 9, further comprising;
in accordance with a determination that the detected occupancy in the frequency band or channel exceeds the threshold occupancy, transmitting an RF signal to communicate the new frequency band or channel to the proximate device; and
transmitting the first ultrasound signal over the new frequency band or channel.

* * * * *